June 27, 1967
R. W. OSGOOD
3,327,352
ROTARY TRANSFER MOLDING MACHINE HAVING ROPE FEED
Filed Jan. 13, 1965
6 Sheets-Sheet 2
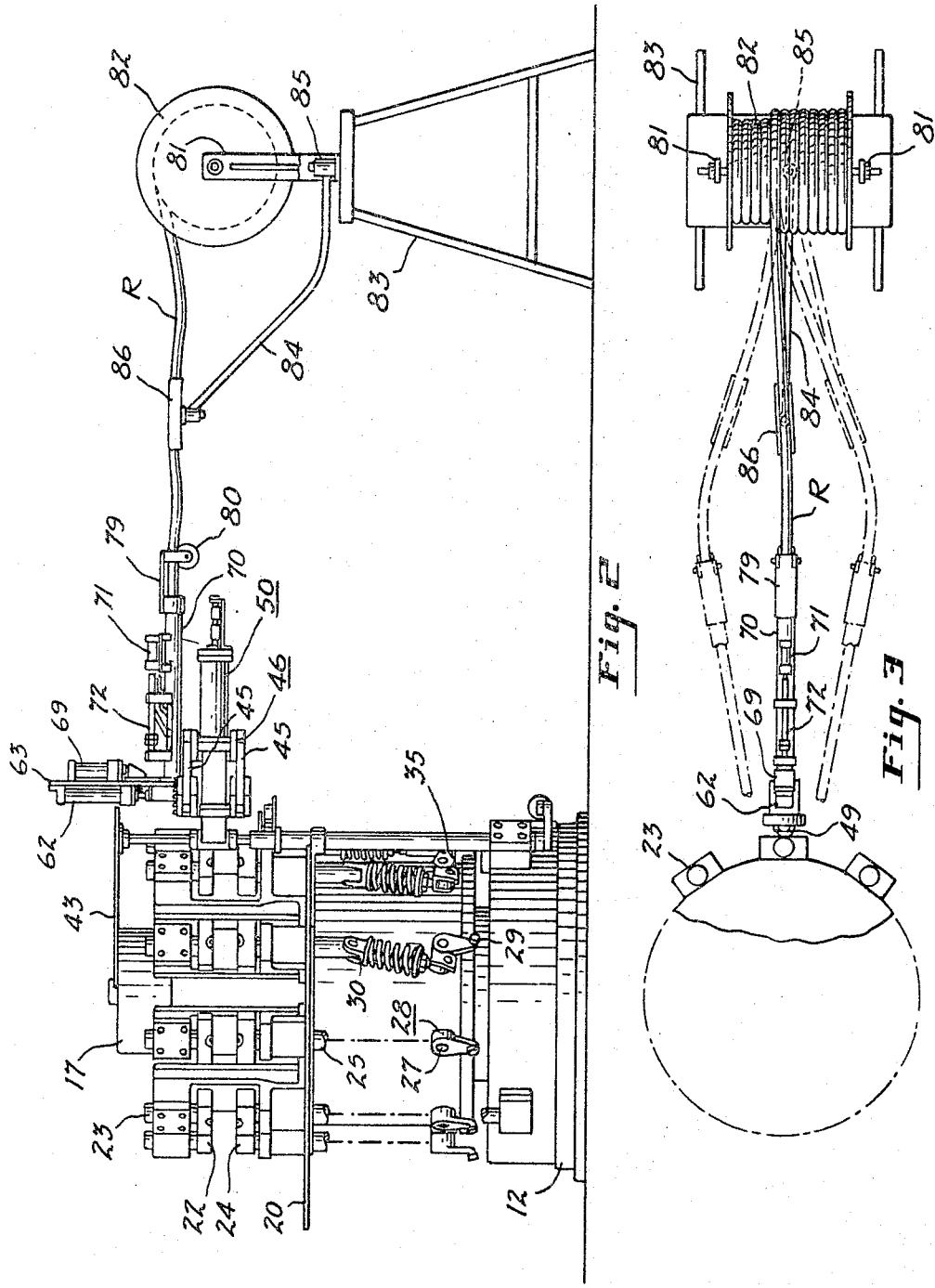
INVENTOR
*Robert W. Osgood*
BY *McHenry, Farrington,*
*Learny & Gordon*
ATTORNEYS

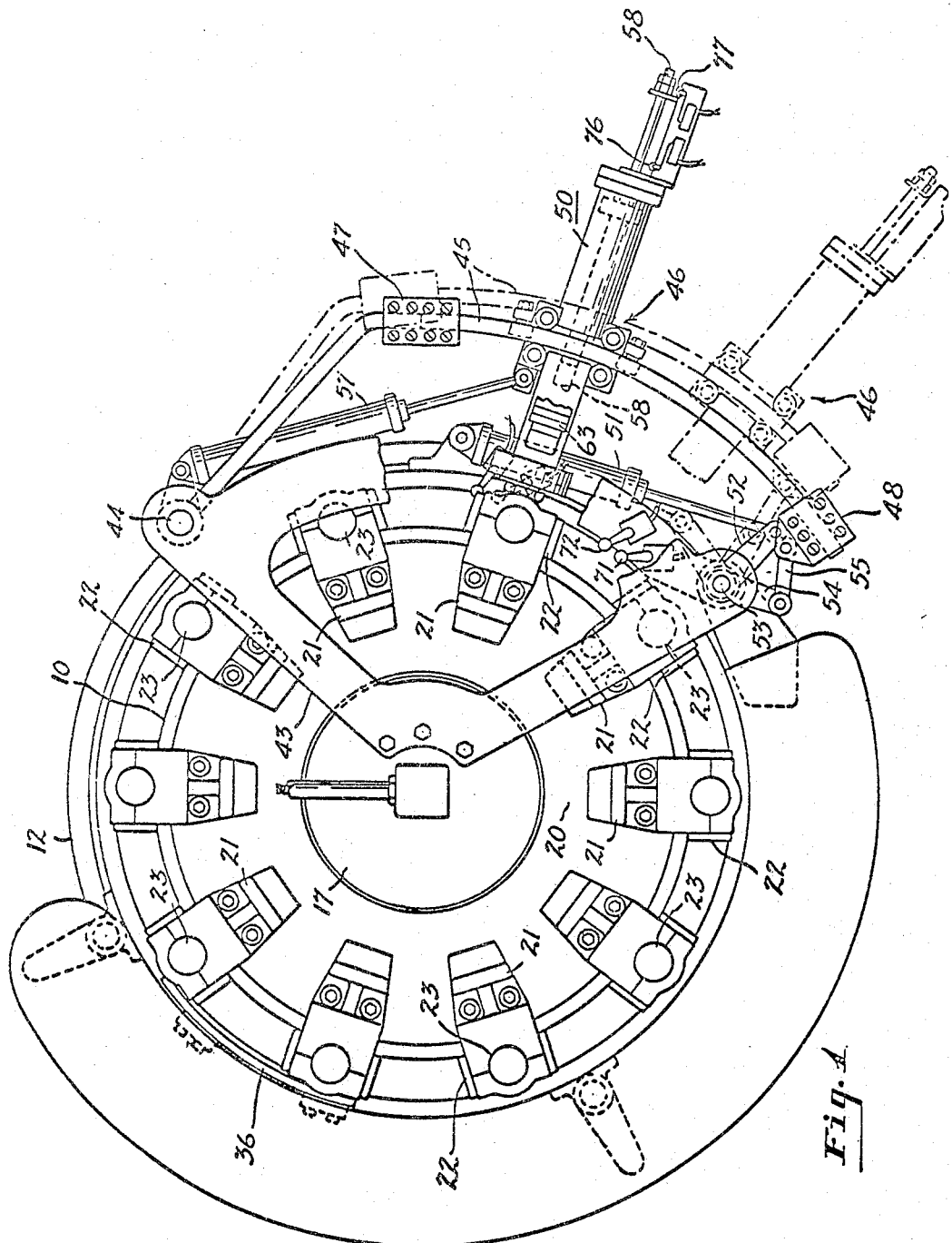

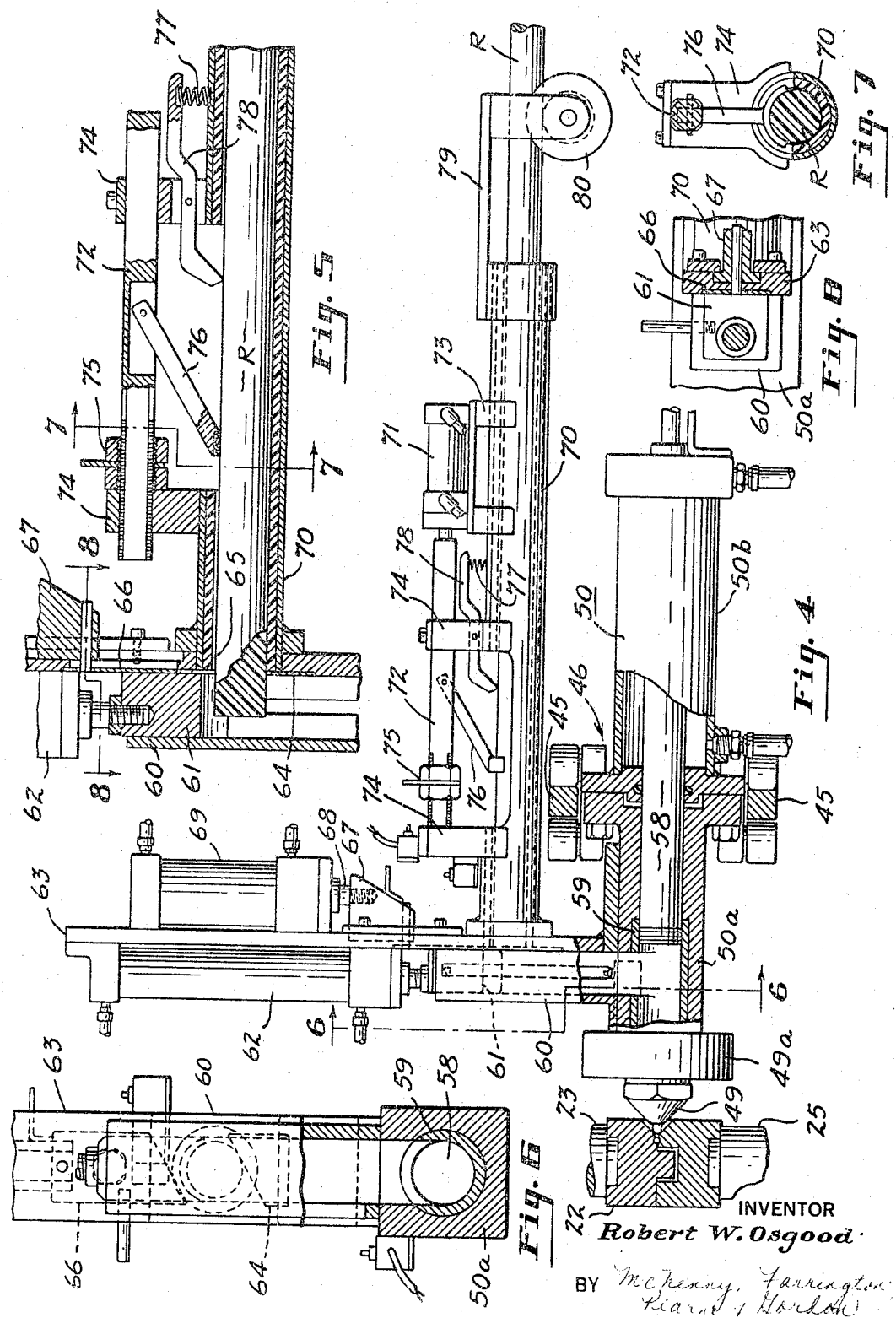

INVENTOR
Robert W. Osgood
BY
ATTORNEYS

June 27, 1967 R. W. OSGOOD 3,327,352
ROTARY TRANSFER MOLDING MACHINE HAVING ROPE FEED
Filed Jan. 13, 1965 6 Sheets-Sheet 5
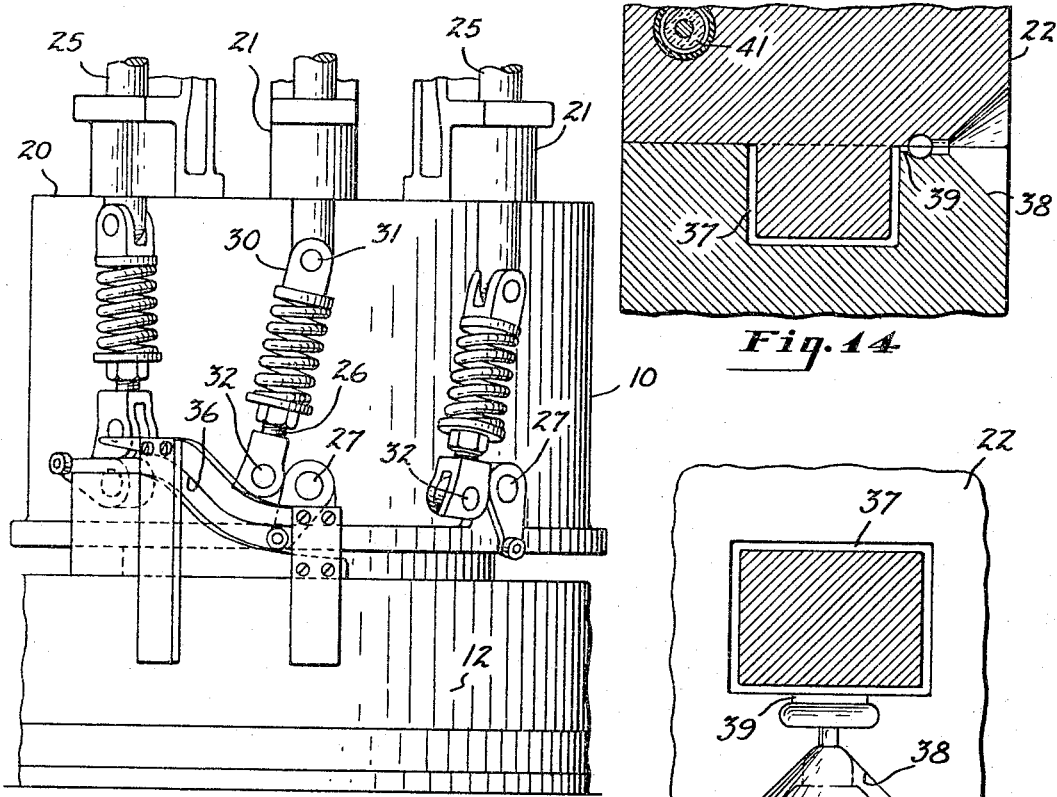
Fig. 16
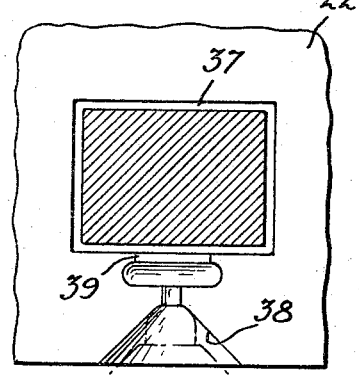
Fig. 14
Fig. 15
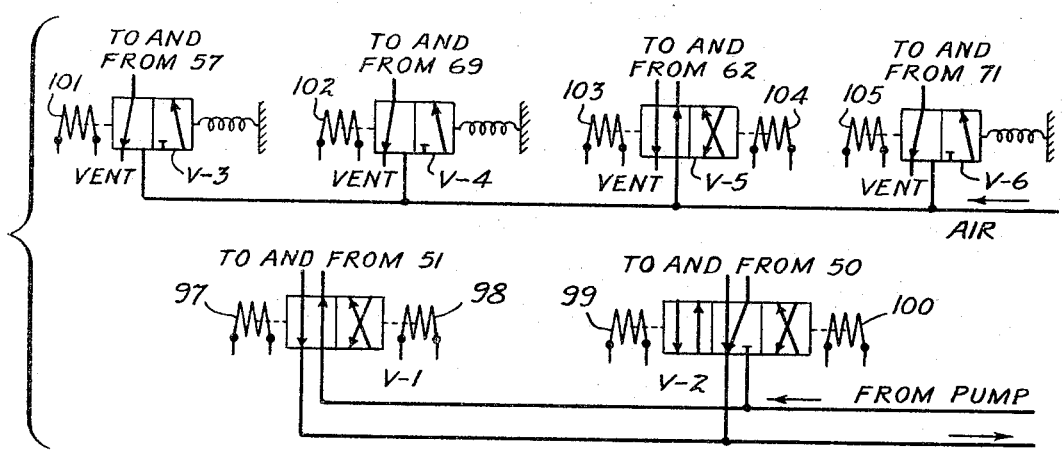
Fig. 17
INVENTOR
Robert W. Osgood
BY
ATTORNEYS

United States Patent Office 3,327,352
Patented June 27, 1967

3,327,352
ROTARY TRANSFER MOLDING MACHINE HAVING ROPE FEED
Robert W. Osgood, Warren, Pa., assignor to El-Tronics, Inc., Warren, Pa., a corporation of Pennsylvania
Filed Jan. 13, 1965, Ser. No. 425,247
7 Claims. (Cl. 18—20)

This invention relates to improvements in transfer molding means for molding articles from plastic materials, and particularly to transfer molding means employed with turret-type apparatus of the continuously (non-intermittently) rotating type. The invention further relates to injection molding apparatus in which the charge is in a preformed length, as in the shape of a "rope." The rope is advanced and consumed in increments by injection apparatus as distinguished from, for example, the use of granules, pellets, and the like.

Constantly rotating apparatus of the turret-type is preferred over intermittently rotating apparatus because of the substantial savings in both initial and operating costs. Equipment which must be intermittently translated from one dwell position to the next is subjected to inertia loads that require a heavy and rugged design. Power consumption is relatively high and wear is relatively great. The drive must comprise either complicated and costly mechanical arrangement, such as a Geneva drive, or sophisticated and expensive electrical, hydraulic, or pneumatic drive systems.

Constantly rotating turrets avoid all these disadvantages. A large turntable array of molds and the like may be driven through its endless cycle by a simple power train originating at an electric motor or the like which turns at a constant speed.

The advantages of a turret apparatus of the constantly rotating type over turret apparatus of the intermittently advanced type have naturally prompted the use of the former when particular applications allow it. However, continuously rotating turret-type mold arrays have not been successfully utilized in the automatic pressure injection molding of thermosetting plastics and certain other plastics, neither of which can be successfully stored in large quantities at elevated temperatures, such as within a heated extrusion cylinder. Suggestions of the prior art for automatic pressure injection molding of materials of this type have contemplated the employment of intermittent or dial type feeds for feeding a succession of molds past an extruder and allowing each of them to dwell by the extruder during filling of the mold and for an additional period of time during which extrusion pressure continues to be applied to the mold (see, for example, U.S. Patent 2,738,551 and particularly column 5, line 72, and following).

The present invention provides means whereby a variety of compounds, especially those of the thermosetting type, may be successfully molded by pressure injection and with molding apparatus of the continuously rotating turret-type. As implied from the preceding, other compounds which have not heretofore been successfully moldable by pressure injection and continuously rotating mold array may also be used in the practice of the present invention.

This invention contemplates the provision of an extruder that is capable of feeding and maintaining feeding pressure on constantly moving mold units without interruption of constant rotary motion of the mold turret or table, together with an arrangement such that each increment of the molding charge experiences only a relatively brief sojourn within the extruder. The invention further contemplates a feeding arrangement for the material to be molded in which the charge is in the form of a substantially continuous length, such as a rope. The rope is intermittently advanced toward the extruder and used to replenish its charge as needed. In one form, the feeder includes an extruder cylinder that (1) has a displacement not exceeding a low (say 10, or in unusual cases 25) multiple of the volume-capacity of each of the molding units of the turret; (2) is arranged to feed the mold on the fly; and (3) to recharge itself from the preformed rope of moldable material, all as more fully described hereinafter.

Other objects and advantages of the invention will be more fully understood and appreciated from a consideration of the following description and the accompanying drawings.

In the drawings:

FIGURE 1 is a plan view of apparatus exemplifying the rotating turret portion of one form of the present apparatus, the feeding apparatus for the extruder being here removed for purposes of clarification.

FIGURE 2 is a side elevation of the apparatus of FIGURE 1, showing in addition an automatic feeding arrangement for a rope of moldable material.

FIGURE 3 is a plan view of FIGURE 2, illustrating by the dot-dash lines the lateral swing of the rope charge due to feeding the extruder and/or mold on the fly.

FIGURE 5 is a fragmentary, further enlarged side elevation of the advancing means of FIGURE 4 used to forward the rope-charge toward the extruder.

FIGURE 6 is an off-set section of FIGURE 4 on the line 6—6.

FIGURES 7 and 8 are off-set sections of FIGURE 5 on the lines 7—7 and 8—8, respectively.

Figure 9:
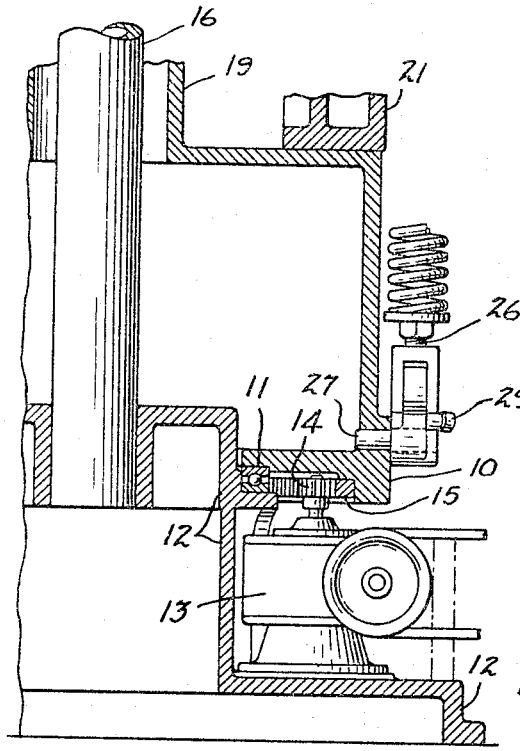

FIGURE 9 is a fragmentary cross-section showing a portion of the turret driving mechanism of the apparatus.

Figure 10:
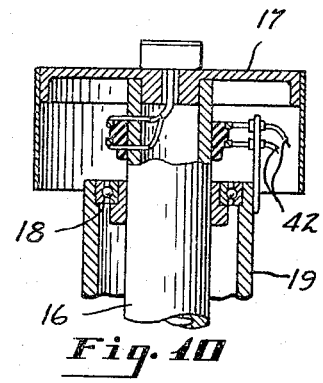

FIGURE 10 is a fragmentary cross-sectional detail of the central top of the turret apparatus.

Figure 11:
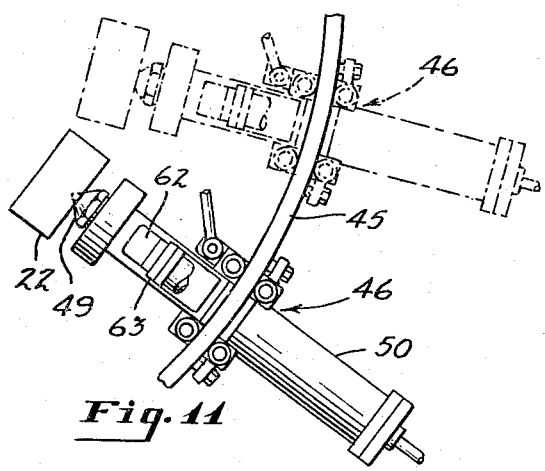

FIGURE 11 is a plan view of a station of the extruder, the automatic feeding apparatus being removed for purposes of illustration, the extruder further being shown by dot-dash lines in alternate positions.

Figure 12:
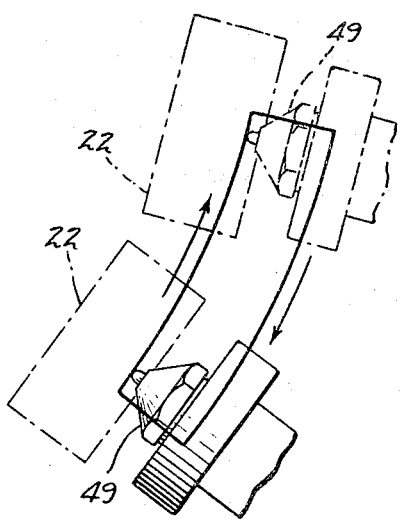

FIGURE 12 is an enlargement of a portion of FIGURE 11 and also shows the closed endless path of the discharge tip of the extending cylinder of the illustrated apparatus.

Figure 13:
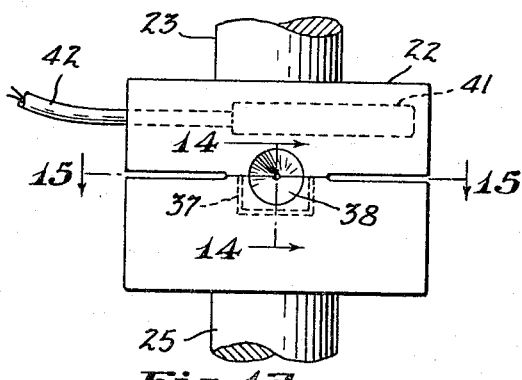

FIGURE 13 is a view of one of the mold assemblies of the apparatus.

FIGURES 14 and 15 are sections of FIGURE 13 on the lines 14—14 and 15—15, respectively.

FIGURE 16 is a fragmentary elevational view of a portion of the appartus not seen in FIGURE 2.

FIGURE 17 is a schematic view of hydraulic and pneumatic valving arrangements for solenoid-controlled valves which may be employed in the illustrated example of the invention.

FIGURE 18 is a diagrammatic view of a microswitch and relay control system for the solenoid-operated valves.

STRUCTURE

Basically, the structure of the illustrated embodiment consists of (a) the rotatable turret with its array of molds and flying extruder, and (b) feeding apparatus to advance a rope-charge to the extruder including the period of time it is either stationary or moving.

Merely for convenience of disclosure, the indicated general parts are described in the order named. The numbers included in parenthesis in the following description refer to the figure numbers of the drawings in which the part being described is best seen.

Rotary turret and extruder

In the illustrated apparatus a rotating base 10 (1–9) is rotatably supported by a bearing 11 (9) on a stationary pedestal 12. The rotating base 10 is provided with a ring gear 15 (9) which is engaged by a spur gear 14 at the output side of an adjustable speed reducer 13 powered by a suitable drive motor (not shown). A stationary central post 16 (10) extends upwardly from the pedestal.

The top portions of the rotating base 10 form a rotating table 20 (1, 2, 16) above which extends a central collar 19 (10) that is rotatably supported on the post 16 by the bearing 18. The post 16 supports a stationary top plate 17 (1, 10) to which is bolted a top frame member 43 (1, 2). Ten mold support stands 21 (1, 9, 16) are carried on the top of the rotating table 20. The mold support stands project over the side edge of the rotating table 20 and carry the mold sections. The upper mold sections 22 (2, 11–15) are directly carried by upper mold section mounting shafts 23 (1, 13) which are clamped to the top portions of the mold support stands 2.

The lower mold sections 24 are supported on lower mold section mounting shafts 25 (13, 16) which are slidingly mounted and guided in the lower portions of the mold support stands 21 for vertical reciprocating movement between mold-opened and mold-closed conditions. The shafts 25 are actuated by the rods 26 (9, 16), the upper ends of which are slidably mounted within the lower ends of the yokes 30. The yokes 30 are pivotally pinned to the lower ends of the mounting shafts 25.

Heavy springs that surround the rods 26 are engaged against collars associated with the rods 26 and yokes 30 in such a way as to tend to maximize the combined lengths of the yoke and rod between the pivot points 31 and 32 (16) but the total amount of this expansion is limited by suitable and end-stop engagement means (not shown) within the yoke 30 and at the portion of the rod 26 received within the yoke.

The details of this arrangement may be seen in U.S. Patent No. 2,440,366, or alternatively in U.S. Patent No. 2,980,960. Such details are immaterial to the present invention, and any suitable mold closing and clamping arrangement may be employed. However, they are here illustrated and described because they are the preferred means for closing the molds, maintaining them closed under adequate clamping pressure, and then reopening them. The bellcrank linkages 28 are carried on pins 27 (9, 16), which in turn are carried by the rotating base 10. The cam followers 29 engage a raising cam 35 (2) and thereby raise the pivot point 32, the rod 26, the shaft 25, and the lower mold section 24. As the pivot point 32 passes between the pivot points 31 and 27, the tendency of the pivot points 31 and 32 to move apart under the bias of the spring causes a snap action to occur, maintaining the mold in raised or closed position under the bias of the heavy spring, and also maintaining the cam follower 29 in a raised position until the follower engages a lowering cam 26 (16) at a much later stage in the cycle of operation.

The upper and lower mold sections 22 and 24, when closed, define a mold cavity 37 (14), a sprue 38 (13–15), and a wide, shallow gate 39 (14, 15) or equivalent, between the sprue and the mold cavity. The molding units may be heated by suitable means, such as heater cartridges 41 (14) supplied with electric power by power lines 42 (10, 13) leading from suitable distributor rings at the top center of the turntable structure.

Figure 4B:
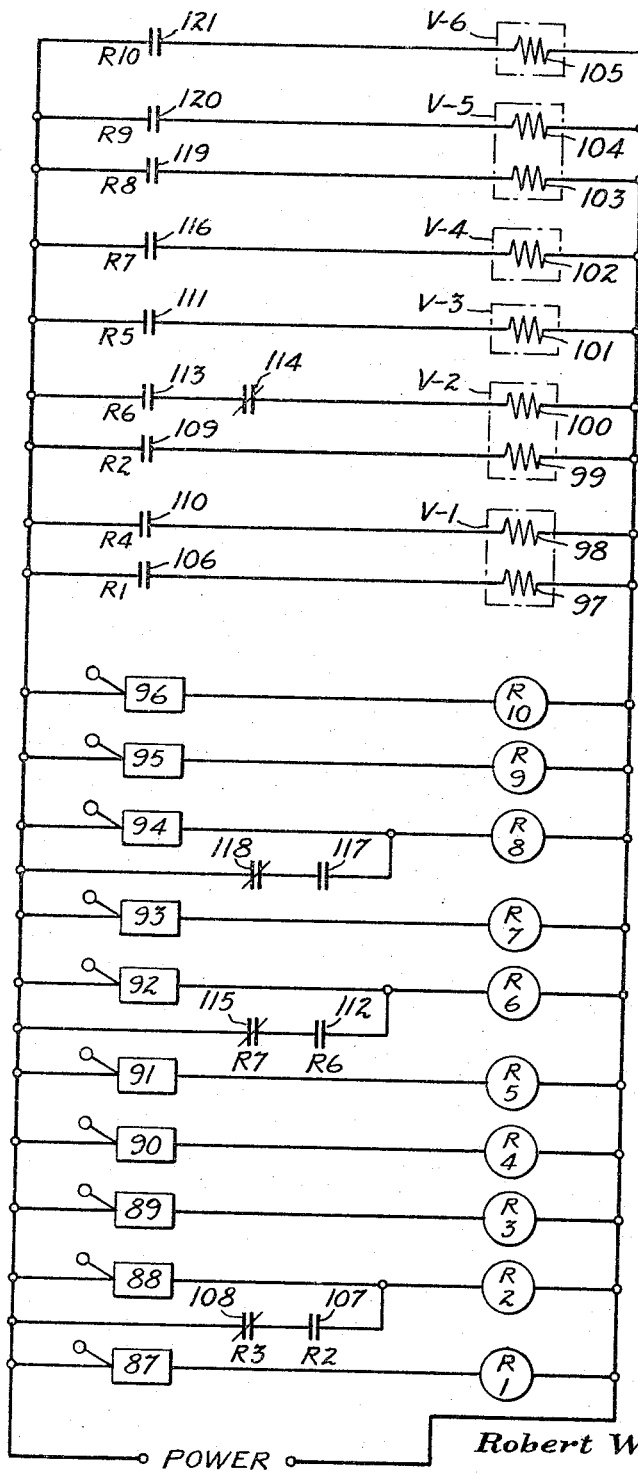
FIGURE 4 is a fragmentary, enlarged side elevation of an extruder and auxiliary apparatus for severing and delivering to the extruder a portion of the rope-shaped charge.

A pair of rails 45 (1, 2, 11) is pivoted at 44 (1) on a vertical post supported at its top end by the frame member 43. The pair of rails 45 swings around this pivot point in a horizontal plane between the two positions illustrated in FIGURE 1. The rails always move bodily with each other, and they are fastened together in spaced relationship by the members 47 and 48 (1). A carriage 46 (1, 2, 11) is translatable along the rails 45 between the members 47 and 48. The carriage carries an extruding cylinder 50 having a discharge orifice at its discharge end 49 (4, 11, 12, 15). The discharge end of the cylinder is surrounded by a heating head or collar 49a as shown in FIGURE 4.

The shifting of the rails 45 about the pivot point 44 is controlled by an actuating cylinder 51 (1), that operates through a lever 52 to turn a shaft 53 which is supported for oscillation on the pedestal 12 and frame member 43. A pair of arms 54 keyed to the shaft 53 drives the wide link 55, which in turn is pivoted to the member 48.

A pneumatic actuating cylinder 51 (1) is linked to the carriage 46, driving the carriage in return movement along the rail 45 from the solid-line position shown in FIGURE 1 to the position shown by dot-dash lines in FIGURE 1.

Rope feed to extruder

FIGURES 2 through 8 show best the apparatus designed to advance a rope-shaped charge of moldable material toward an extruder and to sever and deliver increments of the rope directly into the extruder.

More particularly, the hydraulically operated extruder or ejection cylinder 50 comprises (4) end-butted sections $50(a)$ and $50(b)$, both of which accommodate the reciprocal axial movement of a piston or pusher rod 58. Forward of section $50(a)$, a fixed delivery tube 59 leads to the nozzle 49 and receives the endwise plunging action of the piston rod 58. A loading chamber 60 extends laterally through a loading station of the extruder located at a side of section $50(a)$ and communicates with the delivery tube 59.

The chamber 60 (4, 6, 7) houses the vertical reciprocal action of a plunger 61, which is actuated by an overhead pneumatically operated cylinder 62 mounted on a support plate 63. The plunger 61 has a concave radius end contour which is congruent with that of the inside cylindrical form of the delivery tube 59 when the plunger 61 is in its lowermost position.

Closely aligned with the operation of the plunger 61 is that of a scissors-like severing means which cuts increments from a rope-shaped charge. A lower blade 64 (6) of the severing means has a slanting cutting edge and is suitably mounted on the plate 63 just below matching feed openings 65 in the loading chamber 60 and plate 63. A cooperating upper blade 66 has a similar slanting cutting edge and is bolted to a holder block 67 attached, in turn, to and vertically reciprocated by a piston rod 68 of a pneumatically operated cylinder 69.

A guide tube 70 (4, 5) fixed to the plate 63 in registry with the openings 65 supports a rope R of moldable material for axial travel. As previously indicated, the nature of the moldable material is not critical to the invention. It may comprise any moldable plastic, such as a polyester resin. Additionally, the rope R may include many additives known in the art such as reinforcing fibers (glass or asbestos fibers), plasticizers, extenders, coloring agents and the like.

The tube 70 carries means to move the rope R. In the form shown (4, 5, 7) a pneumatically operated cylinder 71 horizontally reciprocates a rod 72. A mounting base 73 carried by the tube 70 supports the cylinder 71, while guides 74, also supported by the tube 70, carry the rod 72 for free reciprocal movement. A nut 75 adjustably positioned along a threaded end of the rod 72 strikes the left hand guide 74 (4, 5) to limit travel in that direction. A yoke 76 freely pivoted on the rod 72 normally lies against the rope R by its own weight. A spring 77 urges a holding ratchet 78 pivoted on the right hand guide 74 (4) against the rope R to retain it in place. A bracket 79 secured at the entrance end of the tube 70 (4) by a collar rotatably carries a guide wheel 80 over which the rope R moves.

Brackets 81 support a reel 82 of the rope charge (2, 3, 7) on a suitable stand 83. An arm 84 has at one end a collar 85 pivotally mounted on the stand 83 beneath the rail 82; and at the other end a pivotally mounted channel 86 through which the rope R moves on its way to the guide wheel 80 and tube 70.

OPERATION

The present invention is capable of accepting a "rope" form molding compound, in various diameters, and feeding the rope automatically, on demand, to an extruder where the molding compound is compressed in a heated cylinder and then forced through a nozzle of the cylinder into a mold. At the same time, the extruder and mold may be engaged while both are moving through an arc in unison as part of a rotating turret. The timing cycle of the apparatus for the various steps involved may be initiated through microswitches which control the various operating cycles in a desired time sequence.

With the carriage and extrusion cylinder in the solid-line position shown in FIGURE 1, retraction of the cylinder 51 pivots the rails 45 inwardly toward the rotating turret and clamps the discharge end 49 of the extrusion cylinder into one of the passing sprues 38. This, of course, requires proper synchronizing, and this may be achieved in any suitable manner, as by provision of a microswitch for sensing when a passing mold reaches proper position and thereupon, through a relay-controlled solenoid-actuated valve, valving a fast-acting hydraulic circuit to retract cylinder 51. Similar control arrangements may be provided for other steps in the operating cycle of the apparatus. One arrangement is shown schematically in FIGURES 17 and 18.

When the microswitches 87–96 (18) are closed, they respectively energize the relays R–1 to R–10. The microswitches 87–90 inclusive are momentarily closed in sequence as each molding unit passes the extruding station. The microswitch 91 is closed only when the rails 45 are in their outward position, as shown in dotted lines in FIGURE 1. The microswitch 92 is closed when the rod 58 (1, 4) associated with the extruder cylinder reaches a given point corresponding to a certain measure of extruder exhaustion, but this closing of microswitch 92 occurs sufficiently short of a full advance position of the extruder, so that the extruder is not exhausted after the microswitch 92 is closed but before an associated mold is completely filled. The microswitch 93 is closed when the rod 58 is fully retracted to the position shown in FIGURE 1. The microswitch 94 is closed by the downward movement of the upper cutter blade 66, microswitch 95 is closed by the piston rod 58 of the extruding cylinder 50 reaching a predetermined advance with respect to its fully retracted position; and microswitch 96 is closed by the return movement of the plunger 61.

The solenoids 97–105 shown in FIGURES 17 and 18 are associated with the solenoid-operated hydraulic or pneumatic valves V–1 to V–6 that are indicated diagrammatically in FIGURE 18 and schematically in FIGURE 17. The valve V–1 has two positions for reversing the pressure and drain connections of the ends of the cylinder 51 which moves the rails 45 in and out. The valve V–2 has two end positions for reversing the pressure and drain connections of the extruder actuating cylinder 50 (1, 4, 11), but when neither of the associated solenoids 99 and 100 is energized, the valve V–2 is self-centering, as by springs, so that the porting connections are as shown in FIGURE 17, i.e., the extruding cylinder 50 is relieved of pressure and is not hydraulically forced in either direction.

The valve V–3 may be spring-urged to a position where the chamber of the associated pneumatic cylinder 57 is vented to the atmosphere. The opposite position of the valve V–3 ports the pneumatic cylinder 57 to a pressure source, thereby extending the cylinder 57 and providing return movement of the carriage 46.

The valve V–4 may be similarly spring-urged to a position where the chamber of the associated pneumatic cylinder 69 is vented to the atmosphere. The opposite position of the valve V–4 ports the pneumatic cylinder 69 to a pressure source, therby extending the cylinder 69 and moving its piston rod 68 and movable cutting blade 69 downwardly as viewed in FIGURE 4.

The valve V–5 has two positions for reversing the pressure and drain connections of the ends of the cylinder 62 which moves the plunger 61 up and down. The valve V–6, like pneumatic valves V–3 and V–4 may be spring-urged to a position where the chamber of its pneumatic cylinder 71 is vented to the atmosphere. The opposite position of valve V–6 ports the cylinder 71 to a pressure source, thereby extending the rod 72 to an outward position away from the cylinder.

The cycle of operation for injection molding of a single passing mold is as follows. As the mold approaches the microswitch 87, the rails 45 are in their withdrawn or dotted-line position, shown in FIGURE 1. As the microswitch 87 is closed, energizing the relay R–1 and closing the switch 106 associated with R–1, the solenoid 97 is energized, thereby porting the cylinder 51 in such a way as to retract it and, through the linkage 52–54, shift the rails 45 to the solid-line position shown in FIGURE 1 and establish and maintain the discharge end 49 of the extruding cylinder in clamped relationship against the associated sprue 38. Shortly thereafter, the passing mold engages the microswitch 88, thereby energizing the relay R–2, which is provided with a holding switch 107, so that the relay R–2 remain energized after the mold passes out of contact with the microswitch 88 and until such time as the normally closed switch 108 is opened. The relay R–2 closes the switch 109, thereby energizing the solenoid 99 and shifting the valve V–2 to the position that applies pressure to the extruding cylinder in the extruding direction. The mold is quickly filled and the filled mold then continues to be subjected to extrusion pressure as the mold moves away from microswitch 88 and to microswitch 89.

While switch 107 continues to hold, extruding pressure continues to be applied until the passing mold engages the microswitch 89, when the switch 108 opens, causing relay R–2 to drop out, thereby de-energizing relay R–2 and opening holding switch 107. This action also opens switch 109 and de-energizes solenoid 99 to allow the valve V–2 to return to its neutral position and relieve the extruding cylinder from extruding pressure. Shortly thereafter, the passing mold closes the microswitch 90, momentarily energizing the relay R–4 and closing the switch 110 to energize the solenoid 98 and reverse the position of the valve V–1. This causes the cylinder 51 to extend and shift the track outwardly to the dotted-line position shown in FIGURE 1. As the track reaches its outward position, it closes the microswitch 91, energizing the relay R–5 and closing the associated switch 111 to energize the solenoid 101 and shift the valve V–3 so as to port the cylinder 57 for return movement of the carriage 46.

It is to be noted that the advancing movement of the carriage 46 is accomplished by the driving engagement between the mold sprue 38 and the discharge end 49 of the extrusion cylinder, with the sprue being the driving member. Thus, synchronism between the motion of the passing mold and of the extruding cylinder during the extruding operation is accomplished in a very simple manner. Return of the carriage toward the end of the rails 45 associated with the member 48 completes the operating cycle and the apparatus is ready to repeat the cycle in association with the next succeeding mold.

When the extruder plunger 58 is sufficiently fully advanced, an element on this rod trips the microswitch 92, energizing the relay R–6 and closing the holding switch 112 and also switches 113 and 114 associated with the relay R–6. If the extruder is in the middle of its arcuate path of advance, the injection operation continues even after closing of the microswitch 92. This is true because the relay R-2 remains energized at this stage and therefore normally closed switch 114 which is associated with the relay R-2, remains open. As soon, however, as the relay R-2 drops out, as upon momentary closure of the microswitch 89, the switch 114 closes, thereby energizing the solenoid 100 and moving the valve V-2 to port the extrusion cylinder 50 for return movement. As the extruding cylinder 50 returns to its fully retracted position, the microswitch 93 is closed, thereby energizing the relay R-7. This opens the associated normally closed switch 115, thereby allowing the relay R-6 to drop out.

Closing of the microswitch 93 and energization of relay R-7 also serves to close switch 116 with subsequent current flow through solenoid 102. This action closes valve V-4 operating pneumatic cylinder 69 and lowering the cutting blade 66 to sever the rope charge R. The cutting blade then returns to its original position because of the spring-loading of valve V-4.

The downward travel of the cutting blade 66 trips microswitch 94, energizing relay R-8 which is provided with a holding switch 117, so that the relay R-8 remains energized after the cutting blade 66 passes out of contact with its associated microswitch 94 and until such time as a normally closed switch 118 is opened. The relay R-8 also closes a switch 119, thereby energizing the solenoid 103 and shifting the valve V-5 to a position that applies pressure to the cylinder 62 causing downward travel of the plunger 61. Since rod 58 of the cylinder 50 is in a retracted position at this time, due to the demand signal for more rope, rod 58 allows cylinder 62 to move the vertical plunger 61 downwardly, thereby forcing the severed piece of rope into the confines of the delivery tube 59.

While switch 117 continues to hold, downward pressure continues to be applied to the plunger 61 until the rod 58 moves past the vertical opening (4) of the chamber 60. At this time, an exposed portion of the rod 58 momentarily trips a microswitch 95 when switch 118 opens. This causes relay R-8 to drop out, thereby de-energizing relay R-8 and opening switch 117. At the same time, this action also opens switch 119 and de-energizes solenoid 103, while closing switch 120. Now solenoid 104 is energized, reversing the porting on cylinder 62 and causing it to return plunger 61 to its home position. The cycle as just described is ready to repeat itself on demand of the extruder.

In the meantime, the return movement of the plunger 61 (operated by valve V-5) momentarily trips microswitch 96, thereby energizing relay R-10. This action closes switch 121 and activates solenoid 105, thus closing valve V-6 and operating cylinder 71. The resulting outward stroke of rod 72 forces yoke 76 against the rope R and advances a segment of the rope into the loading chamber 60, the actual length of the segment being determined by the nut 75 and left hand guide 74 (4). The ratchet 78 rides over the rope R during its forward advance. The valve V-6 being spring-loaded, cylinder 71 is shortly thereafter returned to its original position.

As shown in FIGURE 3, the mating of the extrusion nozzle 49 with a sprue 38 of the rotary turret does not interfere with the advance of the rope R even though the nozzle and sprue may be jointly moving through an arc. Due to the pivotal mounting at both ends of the arm 84, the rope R can swing freely on either side of a direct-line feed as illustrated by the dot-dash positions of the rope (3).

It is to be noted that the retraction of the extruding cylinder and the recharging operation occurs on demand after the extruding cylinder charge has been sufficiently depleted. This occurs not less frequently than after a low multiple of injecting operations. It may occur as frequently as every injecting operation. In this respect, it may be observed that the apparently high ratio between the volume of the extruding chamber and the volume of the mold cavity in FIGURE 4 is exaggerated because of the deceptively small area of the particular region of the mold cavity that is within the plane of the section shown in FIGURE 4, and that this ratio is actually low enough so that the delivery tube 59 is depleted after each low multiple of injecting operations.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. In a molding machine having a turret rotatable at a generally constant rate, a plurality of molding units carried by the turret, each of the molding units comprising relatively movable cooperative elements defining therebetween a sprue, said sprue communicating with mold-cavity spaces defined between the mold elements; the improvements of means for advancing a length of preformed molded material to said molding units without interrupting rotation of the turret at said generally constant rate, said means comprising an extruder having a discharge port facing a succession of said sprues, means mounting said extruder for movement along an arc having the same center as said turret, means synchronized with the turning of said turret for shifting said extruder to clamp its discharge port against each passing sprue and thereafter to release said clamping engagement after travel of the extruder along said arc in synchronism with the passing sprue, said extruder and each passing sprue being arcuately movable as a unitary assembly while maintaining said clamping engagement, advancing means to feed said preformed length of moldable material toward the extruder, and transfer means to separate a predetermined amount from said length and place the separated amount in operative relation with the extruder for subsequent ejection therefrom during a defined clamping arrangement with a sprue.

2. In a molding machine having a turret rotatable at a generally constant rate, a plurality of molding units carried by the turret, each of the molding units comprising relatively movable cooperative elements defining therebetween a sprue, said sprue communicating with mold-cavity spaces defined between the mold elements; the improvements of means for advancing a rope-shaped charge of moldable material to said molding units without interrupting rotation of the turret at said generally constant rate, said means comprising an extrusion cylinder having a discharge orifice facing a succession of said sprues, means mounting said extrusion cylinder for movement along an arc having the same center as said turret, means synchronized with the turning of said turret for shifting said cylinder to clamp its discharge orifice against each passing sprue and to thereafter release said clamping engagement after travel of the cylinder along said arc in synchronism with the passing sprue, said cylinder and each passing sprue being arcuately movable as a unitary assembly while maintaining said clamping engagement, and loading means for the extrusion cylinder forming a part of said unitary assembly and arcuately movable therewith, said loading means including advancing means adapted intermittently to feed said rope-shaped charge of moldable material to a point adjacent the extrusion cylinder, and transfer means to sever a predetermined amount from said rope-shaped charge and deposit the severed amount in the extrusion cylinder for subsequent ejection therefrom during a defined clamping arrangement with a sprue.

3. In a molding machine having a turret rotatable at a generally constant rate, a plurality of molding units carried by the turret, each of the molding units comprising relatively movable cooperative elements defining therebetween a sprue, said sprue communicating with mold-cavity spaces defined between the mold elements, a fly feeder for the succession of sprues of the molding units, said fly feeder comprising an extrusion cylinder having a loading station and a discharge orifice facing said succession of sprues, the stroke displacement of the extrusion cylinder not exceeding a low multiple of the volume-capacity of each of the molding units, means mounting said extrusion cylinder for movement along an arc having the same center as said turret, means synchronized with the turning of said turret for shifting said cylinder to clamp its discharge orifice against each passing sprue and thereafter to release said clamping engagement after travel of the cylinder along said arc in synchronism with the passing sprue, said cylinder and each passing sprue being arcuately movable as a unitary assembly while maintaining said clamping engagement, and loading means for demand refilling of the extrusion cylinder when it approaches exhaustion forming a part of said unitary assembly and being arcuately movable therewith, said loading means including advancing means intermittently to feed a rope-shaped charge of moldable material to a point adjacent said loading station of the extrusion cylinder, and transfer means to sever a predetermined amount from said rope-shaped charge and deposit the severed amount in said extrusion cylinder at the loading station.

4. Apparatus as defined in claim 3 in which said loading means also includes means for automatically charging the ejection cylinder as defined after those of such injection operations that terminate leaving the remaining cylinder charge at less than a predetermined volume.

5. Apparatus as defined in claim 3 in which said advancing means comprises a guide, adapted to support the rope of moldable material, positioned by the extrusion cylinder and terminating adjacent the loading station thereof, and forwarding means effective to engage the rope of moldable material and move it past the terminus of the guide to place a portion of the rope in a position for transfer to the extrusion cylinder.

6. Apparatus as defined in claim 3 in which said transfer means comprises a loading chamber communicating with the loading station of the extrusion cylinder and effective to receive within said chamber a length of the rope of moldable material, severing means to separate that length within the chamber from the remnant of the rope-shaped charge, and forwarding means to move the separated length from the loading chamber through the loading station and into the extrusion cylinder.

7. In a molding machine having a turret rotatable at a constant rate, a plurality of molding units carried by the turret, each of the molding units comprising relatively movable cooperative elements defining therebetween a sprue, said sprue communicating with mold-cavity spaces defined between the mold elements, a fly feeder for the succession of sprues of the molding units, said fly feeder comprising an extrusion cylinder having a discharge orifice facing said succession of sprues and having a stroke displacement not exceeding a low multiple of the volume-capacity of each of the molding units, means mounting said extrusion cylinder for movement along an arc having the same center as said turret, means synchronized with the turning of said turret for shifting said cylinder to clamp its discharge orifice against each passing sprue and to thereafter release said clamping engagement after travel of the cylinder along said arc in synchronism with the passing sprue, said cylinder and each passing sprue being arcuately movable as a unitary assembly while maintaining said clamping engagement, injection means for performing injection operations by commencing and then terminating the application of extrusion pressure to said cylinder during successive clamping engagements and arcuate movements of said orifice together with successively passing sprues, said extrusion cylinder mounting means including arcuate track means and means for guiding said cylinder along said track means, said track means being bodily shiftable between a first position at which the discharge orifice of said cylinder is removed from the path of passing sprues and a second position at which the discharge orifice of said cylinder is extended to the path of passing sprues to be engageable with such sprues and drivable in the forward direction along said track means by and in synchronism with said turret during such engagement, means for returning said cylinder between such engagements, and means for demand refilling of the extrustion cylinder when it approaches exhaustion comprising advancing means to feed a performed length of such moldable material toward the extrustion cylinder, and transfer means to separate a predetermined amount from said length and deposit the separated amount in the extrustion cylinder for subsequent ejection therefrom during a defined clamping arrangement with a sprue.

References Cited

UNITED STATES PATENTS

| | | | |
|---|---|---|---|
| 2,333,056 | 10/1943 | Thoreson et al. | 18—20 X |
| 2,518,594 | 8/1950 | Blanchard et al. | 18—20 X |
| 3,007,197 | 11/1961 | Grover. | |
| 3,070,843 | 1/1963 | Jurgeleit | 18—20 |
| 3,121,917 | 2/1964 | Swartz | 18—20 |

FOREIGN PATENTS 1,145,783    3/1963    Germany.

WILLIAM J. STEPHENSON, *Primary Examiner.*